Figure 1:
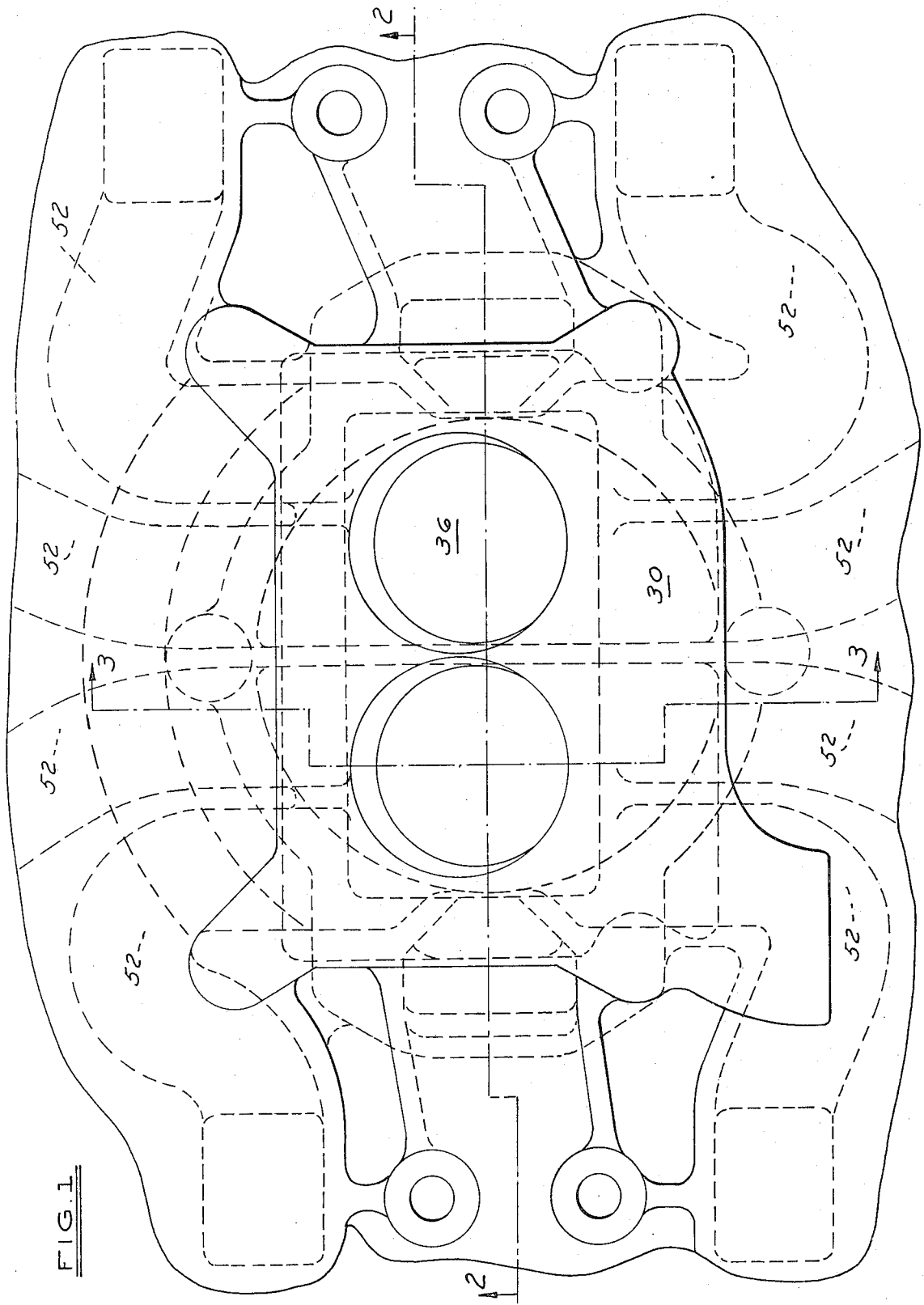

United States Patent [19]

Ader et al.

[11] 3,827,416
[45] Aug. 6, 1974

[54] QUICK-HEAT ENGINE INTAKE MANIFOLD
[75] Inventors: William R. Ader, Westland; Richard P. Krygowski, Livonia, Mich.
[73] Assignee: Ford Motor Company, Dearborn, Mich.
[22] Filed: May 4, 1973
[21] Appl. No.: 357,307

[52] U.S. Cl.......... 123/122 A, 123/122 AC, 165/52
[51] Int. Cl.............................................. F02m 31/00
[58] Field of Search..... 123/122 R, 122 A, 122 AC, 123/122 AB, 141; 165/52

[56] References Cited
UNITED STATES PATENTS
1,611,299  12/1926  Wilka................................ 123/141
1,777,472  10/1930  Mock............................ 123/122 AB
2,936,746   5/1960  Ranquist........................ 123/122 A
2,949,103   8/1960  Carlton........................... 123/122 A Primary Examiner—Charles J. Myhre
Assistant Examiner—R. H. Lazarus
Attorney, Agent, or Firm—K. L. Zerschling; R. E. McCollum

[57] ABSTRACT

The central portion of the intake manifold plenum is separated from the carburetor throttle riser bores by a branch of an exhaust gas crossover passage and joined together by a thin high heat transfer sheet metal tube that passes through the passage with the resultant heating and evaporation of liquid fuel in the tube; a second branch of the crossover passage passes out of the manifold and beneath a second thin sheet metal high heat transfer plate directly under the tube to further evaporate liquid fuel splashed against the plate from the tube.

6 Claims, 6 Drawing Figures

QUICK-HEAT ENGINE INTAKE MANIFOLD

This invention relates, in general, to an internal combustion engine intake manifold construction. More particularly, it relates to one providing for the rapid evaporation of any liquid fuel passing through the manifold on its way to the engine cylinders.

Motor vehicle type internal combustion engines usually have a choking device associated with the carburetor for causing an overrich mixture to be supplied to the engine during cold weather warmup operation. The mere presence of fuel in a liquid state in the mixture, however, can cause the emission of unburned hydrocarbons and other undesirable elements into the atmosphere if the fuel is not evaporated before reaching the cylinders.

Many devices are known in the prior art for heating intake manifolds to evaporate the fuel. U.S. Pat. No. 2,713,857, Keydel, for example, shows in FIG. 5 a passage conveying hot exhaust gases beneath the air/fuel mixture conduits as well as through a worm-like channel around a portion of the carburetor riser bores. It will be noted, however, that in this as well as in most automotive type intake manifold constructions, the manifold is of low thermal inertia cast iron. The cast iron has a very low heat transfer rate and requires heating substantially the entire length of the crossover passage before enough heat soaks through to the floor of the manifold to heat the air/fuel mixture. This of course delays evaporation of the liquid fuel and increases the emission output. It also has a further disadvantage of causing the manifold to act as a heat sink after engine shutdown by retaining the heat instead of dissipating it. This results in a hot soak condition in which the heat passes up through the walls of the carburetor induction passage to the float bowl causing evaporation of the fuel and passage of unburned hydrocarbons into the atmosphere.

Another example of a heated intake manifold construction is U.S. Pat. No. 2,192,067, Betry, utilizing crankcase oil to evaporate the liquid fuel. Again, however, the carburetor and intake manifold induction walls are of low thermal inertia cast iron, which requires a long heat-up. Additionally, in this case, special piping and extra seals must be used to convey the oil from the crankcase while preventing contamination of the air/fuel mixture by oil leaking into the induction passages.

The invention essentially eliminates the above problems by providing a manifold constructed to heat the liquid fuel in the air/fuel mixture so rapidly as to essentially eliminate the need for a carburetor choking device.

It is an object of the invention, therefore, to provide an engine intake manifold in which not only is the manifold floor heated but also the riser bores conveying the air/fuel mixture from the carburetor to the manifold runners.

It is another object of the invention to provide an engine intake manifold with a thin sheet metal high heat transfer member connecting the air/fuel mixture to the manifold runners, and passing hot exhaust gases both around the connecting members as well as beneath a second thin sheet metal portion of the floor of the manifold to rapidly transfer the heat to any liquid fuel in the mixture.

Figure 2:
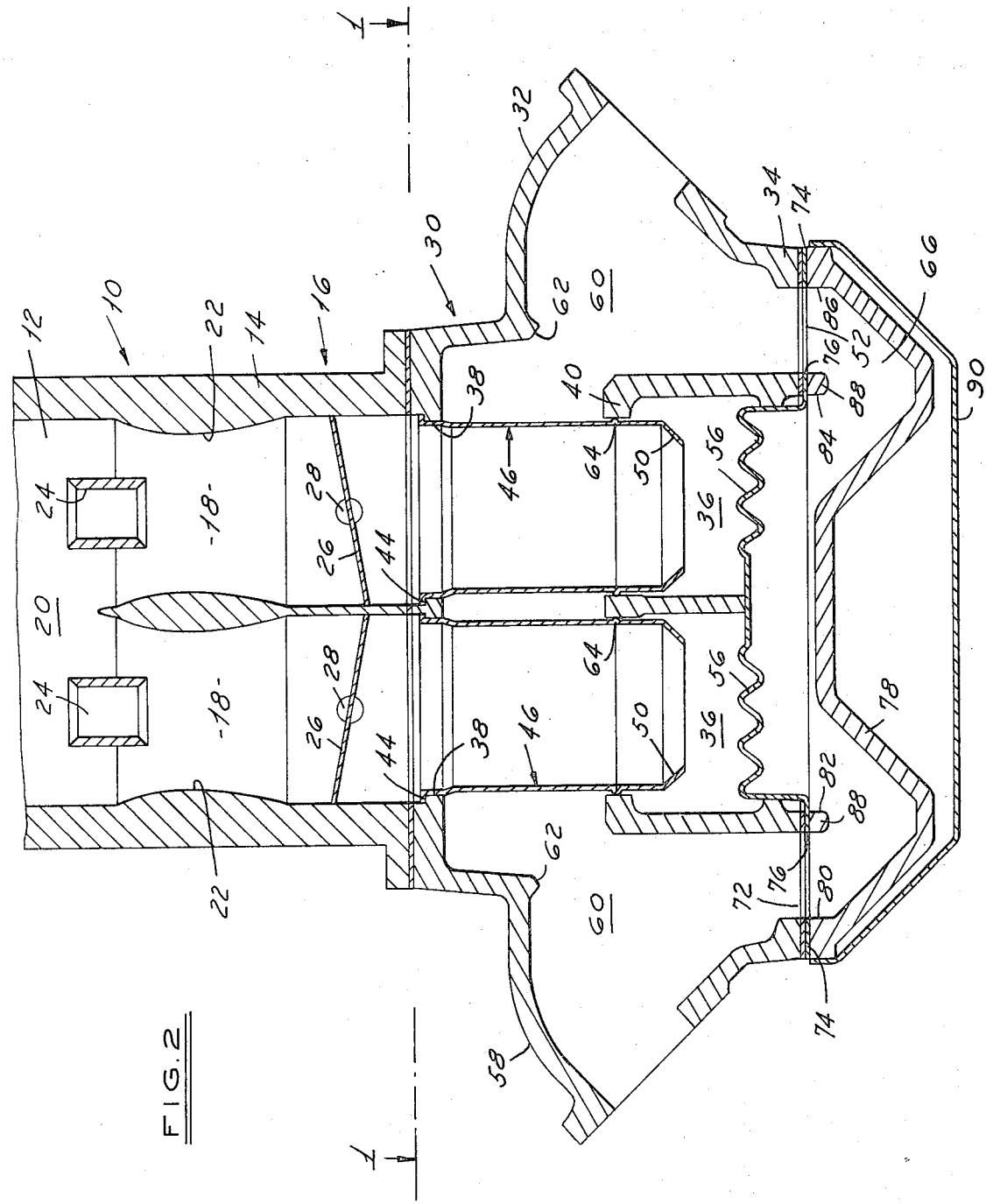
Figure 3:
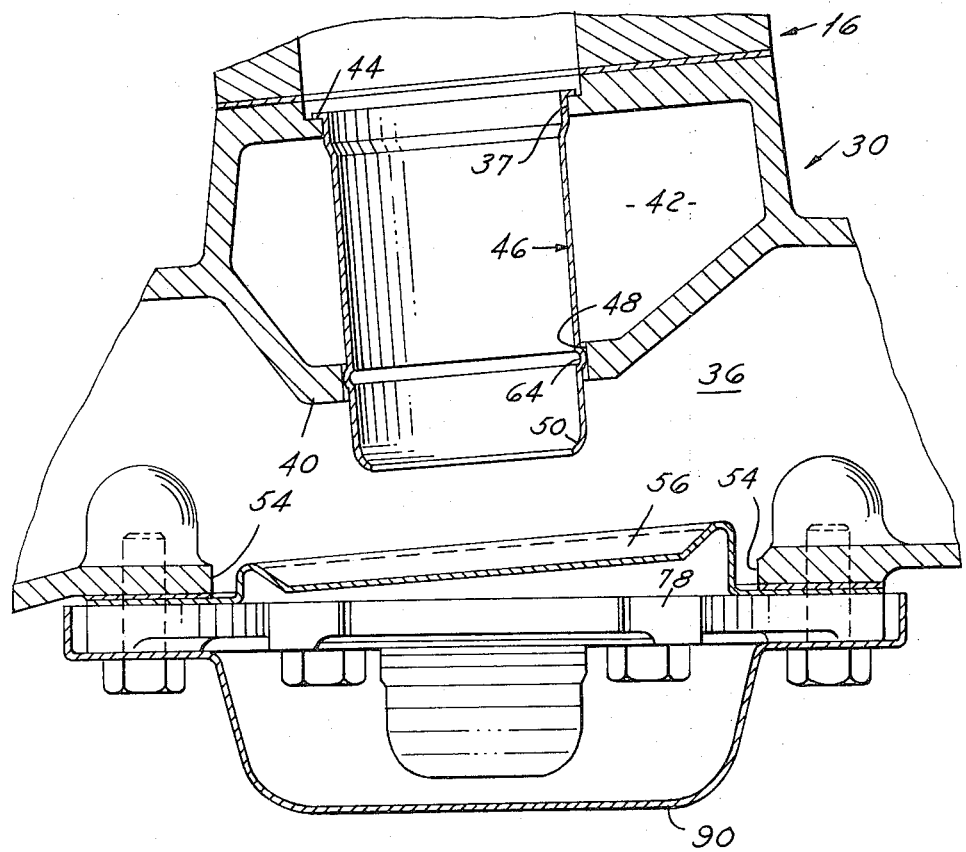
Figure 6:
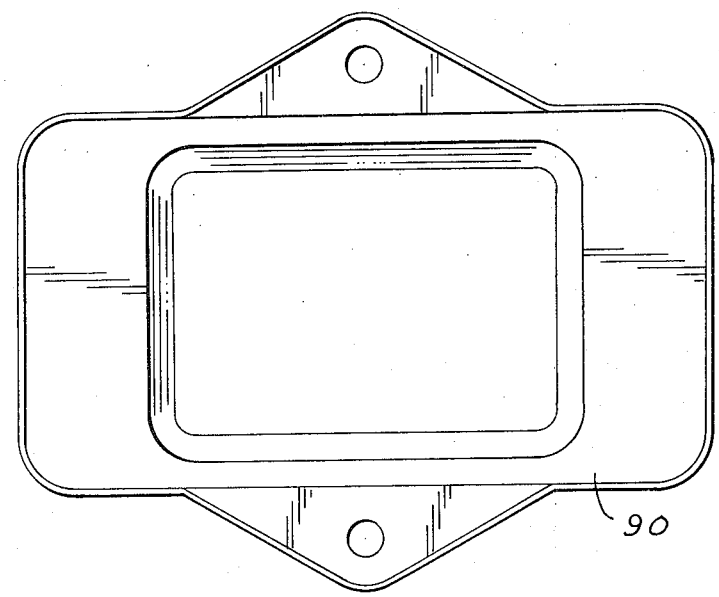
Figure 4:
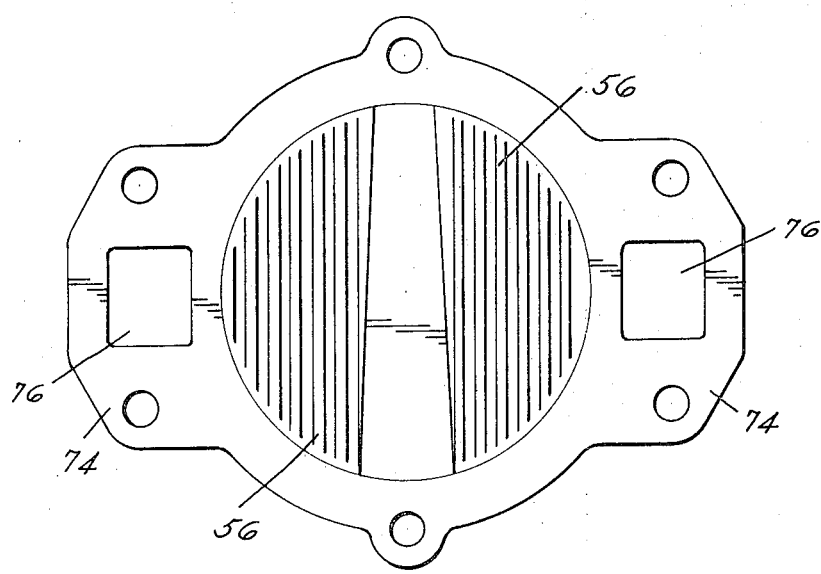
Figure 5:
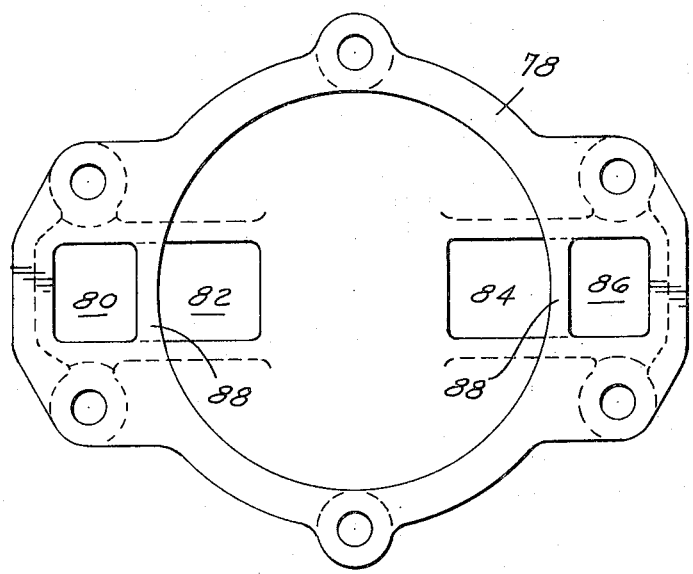

Other objects, features and advantages of the invention will become more apparent upon reference to the succeeding detailed description thereof, and to the drawings illustrating the preferred embodiment thereof, wherein;

FIG. 1 is a top view of a portion of an internal combustion engine intake manifold embodying the invention;

FIGS. 2 and 3 are cross-sectional views taken on planes indicated by and viewed in the direction of arrows 2—2 and 3—3, respectively, of FIG. 1; and, FIGS. 4, 5, and 6 are plan views of details shown in FIG. 3.

FIG. 1 shows a top view of a portion of the intake manifold per se of the invention, FIG. 2 being a cross-sectional view of the manifold as well as a portion of a carburetor mounted on it. More specifically, FIG. 2 illustrates a portion 10 of one-half of a carburetor of a known downdraft type. It has an air horn section 12, a main body portion 14, and a throttle body 16. It has the usual air/fuel induction passages 18 open at their upper ends 20 to fresh air from the conventional air cleaner, not shown. The passages 18 have fixed area venturi 22 cooperating with booster venturiis 24 through which the main supply of fuel is inducted, by means not shown.

Flow of air and fuel through induction passages 18 is controlled by a pair of throttle valve plates 26 each fixed on a shaft 28 rotatably mounted in the side walls of the carburetor body.

Throttle body 16 is flanged as indicated for bolting over the top pad of the engine intake manifold 30, which is cast iron. The manifold consists of upper and lower walls 32 and 34 that define a hollow main body portion or plenum 36. The upper wall 32 contains a pair of air/fuel mixture inlet openings or riser bores 38 that are aligned with the carburetor induction passages 18 for receiving the air/fuel mixture. As best seen in FIG. 3, the central portion of the intake manifold directly beneath the carburetor induction passages 18 is partitioned with a wall 40 to provide a closed chamber 42 that spaces inlets 38 from the central portion of the plenum. This chamber contains hot engine exhaust gases, for a purpose to be described later.

Received in each of the inlet openings 38 is the flanged lip 44 of a high heat transfer sheet metal tube 46. The tubes extend down through chamber 42 and sealingly through an opening 48 in wall 40 so that the carburetor air/fuel mixture passes from the riser bores into the plenum 36. Conical end pieces 50 deflect towards the center into the air stream any liquid fuel running down the tube walls, for better mixing and atomization. As best seen in FIG. 1, eight runners 52 extend from opposite sides of the central portion of plenum 36 to supply the air/fuel mixture individually to each of the engine cylinders, not shown. It will be seen, therefore, that the air/fuel mixture is turned approximately 90° from the direction of discharge from the carburetor for passage into the runners.

Lower wall 34 directly beneath the carburetor induction passages 18 has an opening 54 that is closed by a high thermal inertia, thin sheet metal plate-like member 56 forming the lower wall of the plenum 36. The wall 56 is corrugated as shown in FIGS. 2 and 4 for increasing the effective heat transfer area of the plate. The floor 56 also is located directly beneath the outlets of tubes 46 so that any liquid fuel running down the walls or present in the air/fuel mixture splashes directly against the plate 56 to be evaporated by the transfer of heat from the plate to the fuel, in a manner now to be described.

As stated previously, the invention provides a dual path for the flow of hot exhaust gases around both the tubes 46 and beneath the floor of the plate 56 to provide maximum heat transfer to liquid fuel passing from the carburetor to the engine cylinders. To accomplish this, the intake manifold is provided with a connection to the exhaust manifolding part of the engine, not shown, through a cast iron portion indicated at 58. The latter constitutes a separate exhaust gas crossover passage 60 that passes around a portion of plenum chamber 36 as indicated in FIG. 2. The construction is such that the hot exhaust gases will pass between a pair of exhaust ports, not shown, on opposite sides of the engine through the intake manifold plenum 36, around the tubes 46, as well as beneath the plate 56, to vaporize the air/fuel mixture.

More specifically, the upper chamber 42 is provided with a pair of openings 62 that connect with the exhaust gas crossover passage 60. This permits the flow of exhaust gas through chamber 42 in heat surrounding relationship with the tubes 46 so that the heat is quickly transferred to any raw fuel running down the tube walls and also any liquid fuel in the air/fuel mixture itself. The forming of the tubes 46 with annular bead members 64 of course prevents the communication of the hot exhaust gases to the intake manifold runners 52.

On the other hand, to pass the hot exhaust gases beneath the sheet metal plate 56, the lower wall portion 34 includes a stacked arrangement of members to provide a labyrinth tunnel-like passage 66. More specifically, the crossover passage 60 is open at its lower wall portion 72. The opening is first closed by the corrugated plate member 56 (FIG. 4) having side extensions 74 provided with openings 76. The extensions overlie a second member 78 (FIG. 5) which has cooperating pairs of openings 80, 82 and 84, 86 spaced by sealing ribs 88. Member 78 as best seen in FIG. 2 has essentially a W-shape in cross section and guides the hot exhaust gases in crossover passage 60 down through the inlet 80, around the rib portion 88 up through 82 and along the lower surface of plate 56, back down opening 84 and around the manifold and rib 88, and again out opening 86 into the exhaust gas crossover passage 60. Finally, the arrangement consists of a lower insulating cover 90 enclosing the tunnel-shaped guide member 78 and secured in the manner shown in FIG. 3.

From the above, it will be seen that the hot exhaust gases pass through the intake manifold from one side to the other in a direction essentially at right angles to the normal direction of flow of the mixture through the intake manifold runners to the engine cylinders. It will also be seen that the hot exhaust gas passage has bifurcated branches one of which passes around the tubes 46 and spaces the inlet 38 from the central portion of the manifold, while the other branch of the hot exhaust gas path passes out of the lower wall of the manifold, beneath the high heat transfer plate 56 and then back into the manifold portion of the crossover passage.

The hot exhaust gases therefore will rapidly radiate their heat to both the walls of the tubes 46 and also the plate 56 so that the liquid fuel particles will be quickly vaporized. The necessity for a conventional choke fuel enrichment system, therefore, is essentially eliminated, with a result in reduction in emission of unburned hydrocarbons. The raw fuel flowing against tube 46 is vaporized and mixed with inlet air in the conical mixing section 50 to provide the engine with a combustible charge without additional enrichment only seconds after start.

An added advantage of the thin sheet metal tube heaters 46 and plate 56 over the conventional cast iron plate or lower manifold wall is heat dissipation upon engine shutdown. The conventional cast iron intake manifold with cast iron floor acts as a heat sink during engine shutdown since the heat only slowly dissipates from it. Accordingly, hot engine restart problems may be encountered by too much fuel being vaporized during engine shutdown; that is, the heat from the crossover passage radiates to other parts of the engine and up through the carburetor walls to the fuel bowl. The fuel then vaporizes and can provide too rich a mixture for engine restart.

The thin sheet metal tubes 46 and plate 56 of the invention, on the contrary, have no ability to retain heat once the exhaust gas flow is cut off, and excess vaporization of fuel in the carburetor float bowl on engine shutdown, therefore, does not occur.

While the invention has been shown and described in its preferred embodiment, it will be clear to those skilled in the arts to which it pertains, that many changes and modifications may be made thereto without departing from the scope of the invention.

I claim:

1. An internal combustion engine intake manifold comprising a hollow main body portion having spaced upper and lower walls defining a plenum with a plurality of runners extending therefrom each to one of the engine cylinders, the upper wall having a carburetor air/fuel mixture inlet, first means defining an exhaust gas chamber between the inlet and plenum, a thin sheet metal high heat transfer tube connecting the inlet to the plenum through the chamber in heat transfer relationship to simultaneously conduct air/fuel mixture to the plenum while it is being heated by the exhaust gases surrounding the tube, and other means passing exhaust gases beneath a portion of the lower wall beneath the tube for transferring exhaust gas heat to any liquid fuel in contact therewith, the portion comprising a second thin sheet metal high heat transfer member against which liquid fuel splashes for evaporation of the same.

2. An intake manifold as in claim 1, the lower wall portion comprising a plate corrugated to increase the effective heat transfer surface area.

3. An intake manifold as in claim 1, the other means comprising a passage in the intake manifold containing engine exhaust gases and passing through the manifold to opposite sides of the manifold, the lower wall containing an outlet and inlet respectively on opposite sides of the portion for passage of exhaust gases out of the manifold and along and beneath the lower wall in heat transfer relationship and back into the manifold.

4. An intake manifold as in claim 3, including exhaust gas guide means located adjacent to the inlet and outlet for guiding the gases along the lower wall.

5. An intake manifold for an internal combustion engine comprising a hollow main body portion having spaced upper and lower walls defining a plenum and a plurality of air/fuel mixture conveying runners extending from opposite sides of a central portion of the plenum each to a separate cylinder of the engine, an air/fuel mixture inlet in the upper wall, a thin sheet metal high heat transfer tube connecting the inlet to the central portion for passage of the air/fuel mixture therebetween, the lower wall directly beneath the central portion and tube consisting of a thin high heat transfer sheet metal plate against which air/fuel mixture is splashed upon discharge from the tube, and dual hot exhaust gas passage means to flow hot exhaust gases in a dual path simultaneously around the tube and beneath the plate in a heat transfer relationship for evaporation of liquid fuel passing through the tube and splashed against the plate.

6. An intake manifold as in claim 5, the passage means including an exhaust gas crossover passage extending from one side of the manifold to the other in a direction essentially at right angles to the direction of flow of air/fuel mixture to the runners, the crossover passage having a first branch passing between the inlet and central portion and spacing the two for surrounding the tube with hot exhaust gases, and a second passage passing out of the lower wall of the manifold on one side of the plate and along the plate in heat transfer relationship and back into the manifold on the opposite side of the plate.

* * * * *